(12) United States Patent
Terasaki et al.

(10) Patent No.: US 7,797,956 B2
(45) Date of Patent: Sep. 21, 2010

(54) AIR CONDITIONING APPARATUS

(75) Inventors: Akira Terasaki, Fuji (JP); Kazuto Okitsu, Fuji (JP)

(73) Assignees: Sanyo Electric Co., Ltd, Osaka (JP); Toshiba Carrier Corporation, Tokyo (JP)

( * ) Notice: Subject to any disclaimer, the term of this patent is extended or adjusted under 35 U.S.C. 154(b) by 242 days.

(21) Appl. No.: 12/175,028

(22) Filed: Jul. 17, 2008

(65) Prior Publication Data

US 2008/0276635 A1 Nov. 13, 2008

Related U.S. Application Data

(63) Continuation of application No. PCT/JP2007/050908, filed on Jan. 22, 2007.

(30) Foreign Application Priority Data

Jan. 20, 2006 (JP) ............................. 2006-012201

(51) Int. Cl.
- F25B 41/04 (2006.01)
- F25B 29/00 (2006.01)
- F25B 13/00 (2006.01)

(52) U.S. Cl. .............................. 62/205; 62/222; 62/159; 62/324.1

(58) Field of Classification Search ................... 62/222, 62/205, 225, 498, 159, 324.1, 324.6
See application file for complete search history.

(56) References Cited

FOREIGN PATENT DOCUMENTS

| CN | 1623071 A | 6/2005 |
|---|---|---|
| EP | 1477748 | 11/2004 |
| JP | 2003-214729 | 7/2003 |
| JP | 2005-121333 | 5/2005 |

OTHER PUBLICATIONS

Office Action issued in Chinese Appl 200780002656.5 on Oct. 16, 2009.

(Continued)

*Primary Examiner*—Chen-Wen Jiang
(74) *Attorney, Agent, or Firm*—DLA Piper LLP US

(57) ABSTRACT

A first motor-actuated expansion valve and a second motor-actuated expansion valve which are connected in parallel with each other in back-to-back connection are provided between an outdoor heat exchanger and an indoor heat exchanger. In the first motor-actuated expansion valve, at the time of non-operation and full closure, when the refrigerant pressure on the indoor heat exchanger side is higher than the refrigerant pressure on the outdoor heat exchanger side by a predetermined value or more, the full closure is released by receiving the refrigerant pressure on the indoor heat exchanger side. In the second motor-actuated expansion valve, at the time of non-operation and full closure, when the refrigerant pressure on the outdoor heat exchanger side is higher than the refrigerant pressure on the indoor heat exchanger side by a predetermined value or more, the full closure is released by receiving the refrigerant pressure on the outdoor heat exchanger side.

9 Claims, 3 Drawing Sheets

OTHER PUBLICATIONS

English Language Translation of Office Action issued in Chinese Appl 200780002656.5 on Oct. 16, 2009.
English Language Abstract of JP-2003-214729, Jul. 30, 2003.
English Language Abstract of JP-2005-121333, May 12, 2005.
International Search Report of PCT/JP2007/050908, May 1, 2007.
English language translation of JP-2003-214729, Jul. 30, 2003.
English language translation of JP-2005-121333, May 12, 2005.
International Preliminary Report on Patentability issued in Application No. PCT/JP07/050908 mailed July 31, 2008.
English translation of the International Report on Patentability and Written Opinion issued Jul. 22, 2008 in connection with counterpart application PCT/JP2007/050908.

AIR CONDITIONING APPARATUS

CROSS-REFERENCE TO RELATED APPLICATIONS

This is a Continuation Application of PCT Application No. PCT/JP2007/050908, filed Jan. 22, 2007, which was published under PCT Article 21(2) in Japanese.

This application is based upon and claims the benefit of priority from prior Japanese Patent Application No. 2006-012201, filed Jan. 20, 2006, the entire contents of which are incorporated herein by reference.

BACKGROUND OF THE INVENTION

1. Field of the Invention

The present invention relates to an air conditioning apparatus provided with a plurality of motor-actuated expansion valves.

2. Description of the Related Art

An air conditioning apparatus is provided with a refrigerating cycle in which a compressor, an outdoor heat exchanger, a pressure reducing device, an indoor heat exchanger, and the like are successively connected to each other by piping. As a refrigerant to be filled into the refrigerating cycle, the R410 refrigerant with high pressure is known. In a high-capacity air conditioning apparatus using the R410 refrigerant, and performing refrigerant flow control of a wide range, it is necessary to employ a large-sized motor-actuated expansion valve (PMV) as a pressure reducing device.

However, a large-sized motor-actuated expansion valve is expensive and leads to an increase in the cost, and hence an air conditioning apparatus using two motor-actuated expansion valves connected in parallel with each other is known (for example, Jpn. Pat. Appln. KOKAI Publication No. 2003-214729).

In such an air conditioning apparatus, when the compressor is stopped, each of the motor-actuated expansion valves is fully closed.

However, when the compressor is stopped, and each of the motor-actuated expansion valves is fully closed, a liquid-sealed state where the refrigerant flow path on the outdoor heat exchanger side is liable to occur. If this liquid-sealed state occurs, there is the possibility of the pressure of the refrigerant collected there being abnormally increased because of an increase in the outside air temperature. If the pressure of the refrigerant is abnormally increased, the components of the refrigerating cycle have been damaged in the worst case.

BRIEF SUMMARY OF THE INVENTION

An object of the present invention is to provide an air conditioning apparatus capable of preventing refrigerant pressure from being abnormally increased because of a liquid-sealed state, and excellent in reliability.

An air conditioning apparatus of the present invention comprises:

a refrigerating cycle which includes at least a compressor for sucking a refrigerant, compressing the sucked refrigerant, and discharging the compressed refrigerant, and in which the refrigerant discharged from the compressor is returned to the compressor through an outdoor heat exchanger, and an indoor heat exchanger;

at least a first motor-actuated expansion valve which is provided between the outdoor heat exchanger and the indoor heat exchanger, and in which at the time of non-operation and full closure, when the refrigerant pressure on the indoor heat exchanger side is higher than the refrigerant pressure on the outdoor heat exchanger side by a predetermined value or more, the full closure is released by receiving the refrigerant pressure on the indoor heat exchanger side; and at least a second motor-actuated expansion valve which is connected in parallel with the first motor-actuated expansion valve, and in which at the time of non-operation and full closure, when the refrigerant pressure on the outdoor heat exchanger side is higher than the refrigerant pressure on the indoor heat exchanger side by a predetermined value or more, the full closure is released by receiving the refrigerant pressure on the outdoor heat exchanger side.

DETAILED DESCRIPTION OF THE INVENTION

An embodiment of the present invention will be described below with reference to the accompanying drawings.

Figure 1:
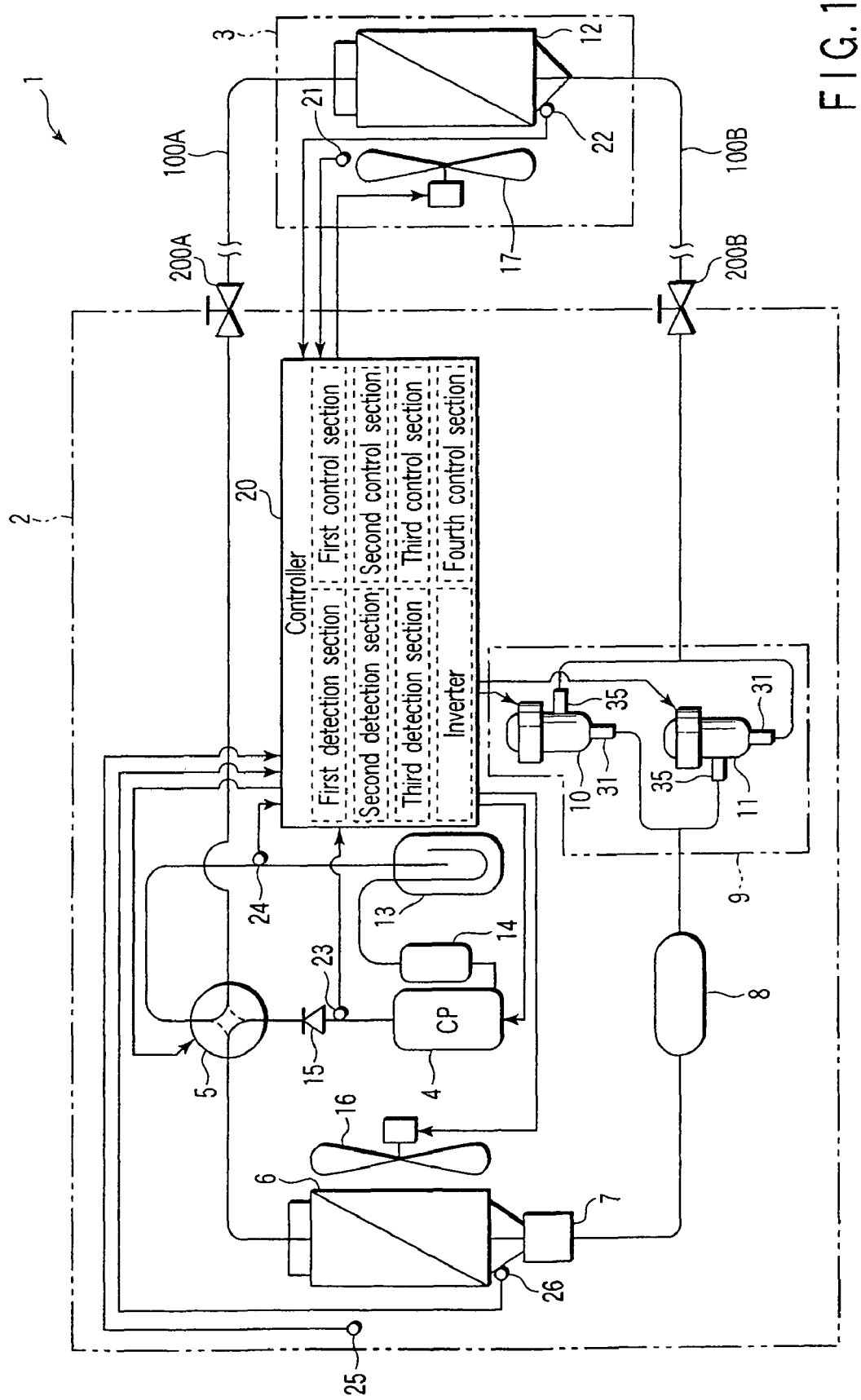
FIG. 1 is a view showing an overall configuration of an embodiment.

As shown in FIG. 1, an air conditioning apparatus 1 is provided with an outdoor unit 2 and an indoor unit 3. The outdoor unit 2 is provided with a gas pipe service valve 200A and a liquid pipe service valve 200B. The indoor unit 3 is connected to the service valves 200A and 200B through a gas pipe 100A and a liquid pipe 100B.

The outdoor unit 2 and the indoor unit 3 are provided with a heat-pump-type refrigerating cycle. This refrigerating cycle includes at least one compressor 4 for sucking a refrigerant, compressing the refrigerant, and discharging the compressed refrigerant, and at the time of cooling, a cooling cycle in which the refrigerant discharged from the compressor 4 is passed through a backflow check valve 15, a four-way valve 5, an outdoor heat exchanger 6, a flow divider 7, a receiver tank 8, a pressure reducing device 9, the liquid pipe service valve 200B, the liquid pipe 100B, an indoor heat exchanger 12, the gas pipe 100A, the gas pipe service valve 200A, the four-way valve 5, an accumulator 13, and a sub-accumulator 14, and is returned to the compressor 4 is formed. At the time of heating, by the changeover of the four-way valve 5, a heating cycle in which the refrigerant discharged from the compressor 4 is passed through a backflow check valve 15, the four-way valve 5, the gas pipe service valve 200A, the gas pipe 100A, the indoor heat exchanger 12, the liquid pipe 100B, the liquid pipe service valve 200B, the pressure reducing device 9, the receiver tank 8, the flow divider 7, the outdoor heat exchanger 6, the four-way valve 5, the accumulator 13, and the sub-accumulator 14, and returned to the compressor 4 is formed.

As the refrigerant described above, the R410 refrigerant with high pressure is used.

The pressure reducing device 9 is constituted of a first motor-actuated expansion valve 10 and a second motor-actuated expansion valve 11 which are connected in parallel with each other in back-to-back connection.

Figure 2:
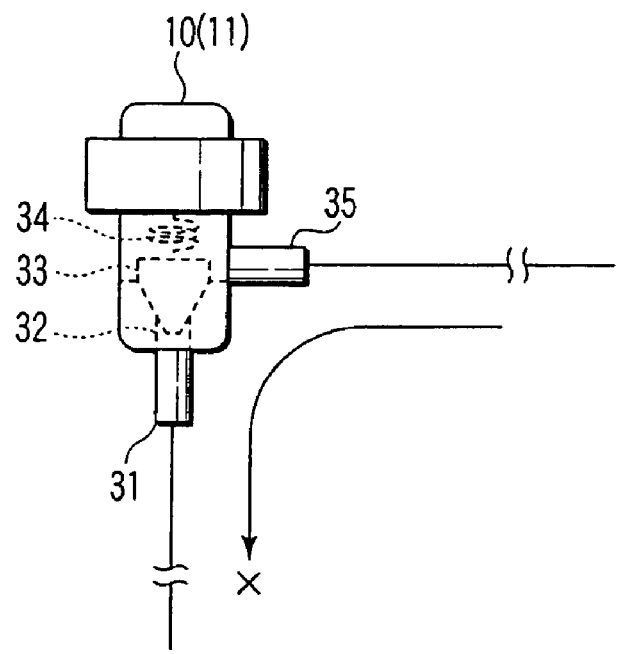
FIG. 2 is a view showing a closed state of each motor-actuated expansion valve of the embodiment.
Figure 3:
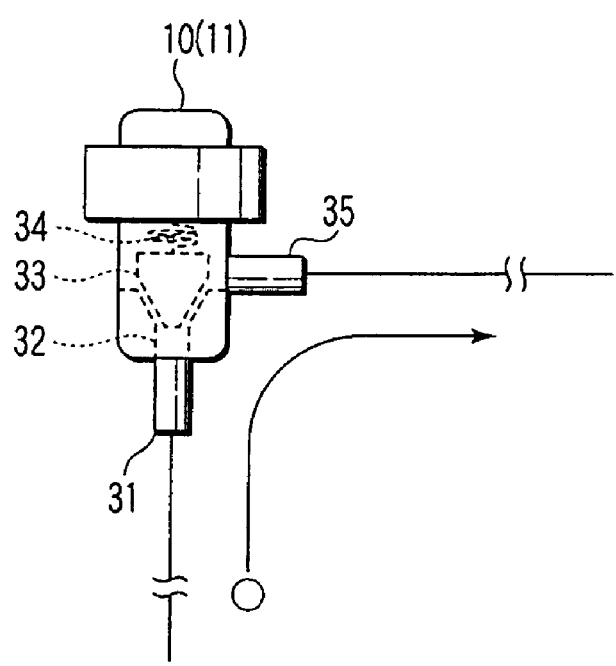
FIG. 3 is a view showing an opened state of each motor-actuated expansion valve of the embodiment.

Each of the motor-actuated expansion valves 10 and 11 is a pulse motor valve (PMV) in which a degree of opening is continuously changed in accordance with the number of input drive pulses, and is provided with, as shown in FIGS. 2 and 3, a first connection pipe 31, a valve seat 32 communicating with the first connection pipe 31, a needle valve 33 for opening/closing the valve seat 32, a coil spring 34 which exerts force for biasing the needle valve 33 against the valve seat 32 side to the needle valve 33, a second connection pipe 35 which communicates with the valve seat 32 when the valve seat 32 is opened, a rod (not shown) for moving the needle valve 33 up-and-down by rotation, a pulse motor (not shown) for rotating the rod, and the like. When the rotor moves up-and-down while rotating concomitantly with the rotation of the pulse motor, the degree of opening which is a gap between the needle valve 33 and the valve seat 32 is changed.

When the pulse motor is not operated, the needle valve 33 is brought into contact with the valve seat 32 by the biasing force of the coil spring 34, and the valve seat 32 is closed in a fully closed state as shown in FIG. 2. However, at the time of the non-operation and the full closure, if the refrigerant pressure on the second connection pipe 35 side becomes larger than the refrigerant pressure on the first connection pipe 31 side by a predetermined value or more, the needle valve 33 is separated from the valve seat 32 against the biasing force of the coil spring 34, the valve seat 32 is opened, and the fully-closed state is released as shown in FIG. 3. As a result of this, a flow of the refrigerant started from the second connection pipe 35 side, and directed to the first connection pipe 31 side is produced.

Further, the outdoor unit 2 includes an outdoor fan 16. The outdoor fan 16 sucks outdoor air, and discharges the sucked air to the outside through the outdoor heat exchanger 6. The indoor unit 3 includes an indoor fan 17. The indoor fan 17 sucks indoor air, and discharges the sucked air to the inside of the room through the indoor heat exchanger 12. An indoor temperature sensor 21 for sensing a temperature Ta inside the room is provided in a suction air course through which air inside the room is sucked by the indoor fan 17. Further, a heat exchanger temperature sensor 22 for sensing a heat exchanger temperature is attached to the indoor heat exchanger 12.

In the outdoor unit 2, a refrigerant temperature sensor 23 for sensing a temperature of the refrigerant discharged from the compressor 4 is attached to the high-pressure side piping between the exhaust port of the compressor 4 and the four-way valve 5. A refrigerant temperature sensor 24 for sensing a temperature of the refrigerant to be sucked into the compressor 4 is attached to the low-pressure side piping between the four-way valve 5 and the accumulator 13. An outdoor temperature sensor 25 for sensing an outdoor air temperature is provided in a suction air course through which air outside the room is sucked by the outdoor fan 16. A heat exchanger temperature sensor 26 for sensing a heat exchanger temperature is attached to a part between the outdoor heat exchanger 6 and the flow divider 7.

The compressor 4, the four-way valve 5, the motor-actuated expansion valves 10 and 11, the outdoor fan 16, the indoor fan 17, and the temperature sensors 21 to 26 are connected to a controller 20.

The controller 20 includes an inverter for outputting drive power to the compressor 4, and also includes the following sections (1 to 7) as main functions.

(1) a first control section which forms the cooling cycle at the time of cooling, and forms the heating cycle at the time of heating.

(2) a first detection section which detects a difference between a sensed temperature Ta of the indoor temperature sensor 21 and a predetermined set temperature Ts as an air-conditioning load.

(3) a second control section which controls an output frequency of the inverter in accordance with the air-conditioning load detected by the first detection section. The output frequency of the inverter is changed, whereby the rotational speed (performance) of the compressor 4 is changed.

(4) a second detection section which detects a degree of superheat SH of the refrigerant in the indoor heat exchanger 12 at the time of cooling.

(5) a third detection section which detects a degree of superheat SH of the refrigerant in the outdoor heat exchanger 6 at the time of heating.

(6) a third control section which controls a degree of opening of each of the motor-actuated expansion valves 10 and 11 in such a manner that the degree of superheat SH detected by the second detection section or the third detection section becomes a predetermined target degree of superheat SHs.

(7) a fourth control section which stops the operation of each of the motor-actuated expansion valves 10 and 11 to fully close the valve when the compressor 4 is stopped (the output of the inverter becomes zero).

Next, the function will be described below.

At the time of cooling, the flow path of the four-way valve 5 is set in the state of the solid lines of FIG. 1, and a cooling cycle in which the outdoor heat exchanger 6 functions as a condenser, and the indoor heat exchanger 12 functions as an evaporator is formed. At the time of heating, the flow path of the four-way valve 5 is switched to the state of the broken lines of FIG. 1, and a heating cycle in which the indoor heat exchanger 12 functions as a condenser, and the outdoor heat exchanger 6 functions as an evaporator is formed.

Further, at the time of cooling or the heating, a difference between the sensed temperature Ta of the indoor temperature sensor 21 and a predetermined set temperature T is detected as an air-conditioning load, and the output frequency of the inverter is controlled in accordance with the air-conditioning load. That is, when the air-conditioning load is small, the output frequency of the inverter is set low, and the output frequency of the inverter is increased as the air-conditioning load is increased. When the air-conditioning load is decreased, the output frequency of the inverter is lowered. As the output frequency is changed, the rotational speed (performance) of the compressor is changed. When the air-conditioning load becomes zero, the output frequency of the inverter also becomes zero, and the compressor 4 stops.

Figure 4:
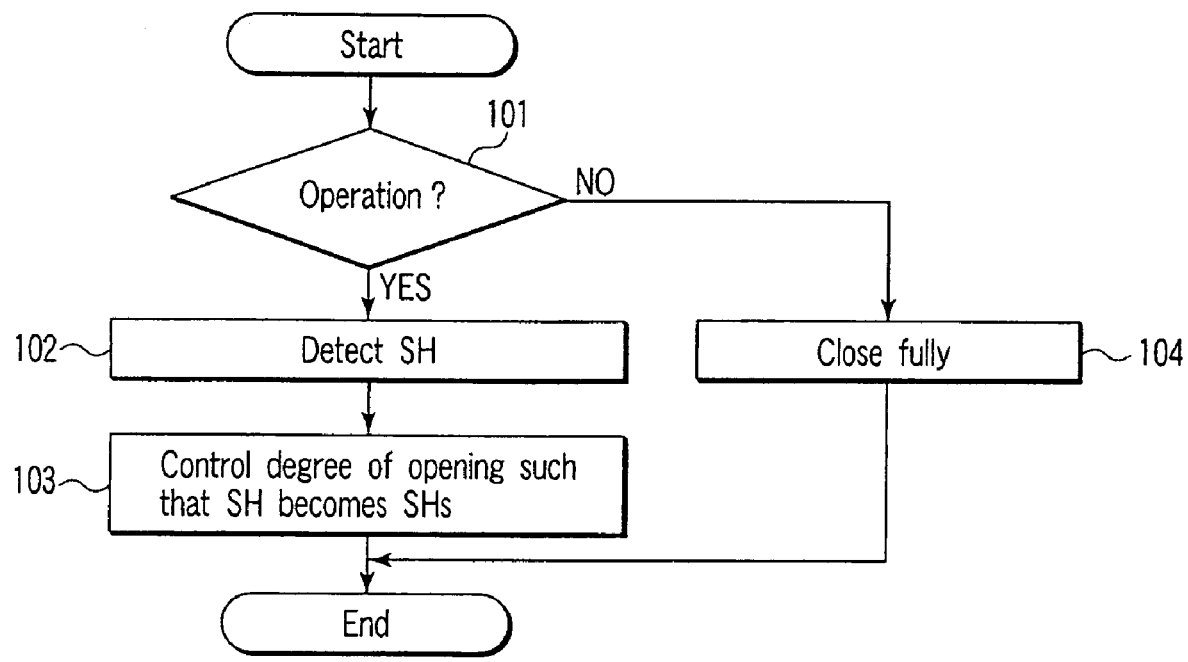
FIG. 4 is a flowchart for explaining the function of the embodiment.

Furthermore, as shown in the flowchart of FIG. 4, at the time of the operation of the compressor (YES in step 101), a degree of superheat SH of the refrigerant in the evaporator is detected (step 102). That is, at the time of cooling, the refrigerant temperature Tc on the entrance side of the indoor heat exchanger 12 which functions as an evaporator is sensed by the heat exchanger temperature sensor 22, at the same time, the temperature Ts of the refrigerant that has passed the indoor heat exchanger 12 is sensed by the refrigerant temperature sensor 24, and a difference between the sensed temperature Tc and the sensed temperature Ts is detected as the degree of superheat SH of the refrigerant. At the time of heating, the refrigerant temperature Te on the entrance side of the outdoor heat exchanger 6 which functions as an evaporator is sensed by the heat exchanger temperature sensor 26, at the same time, the temperature Ts of the refrigerant that has passed the outdoor heat exchanger 6 is sensed by the refrigerant temperature sensor 24, and a difference between the sensed temperature Te and the sensed temperature Ts is detected as the degree of superheat SH of the refrigerant.

The detected degree of superheat SH and a predetermined target degree of superheat SHs (for example, 1 to 5K) are compared with each other, and a degree of opening of at least one of the motor-actuated expansion valves 10 and 11 is controlled in such a manner that the degree of superheat SH becomes the target degree of superheat SHs (step 103).

That is, when the degree of superheat SH is smaller than the target degree of superheat SHs, the degree of opening is adjusted in the decreasing direction, and the refrigerant flow rate is decreased so as to increase the degree of superheat SH. When the degree of superheat SH is larger than the target degree of superheat SHs, the degree of opening is adjusted in the increasing direction, and the refrigerant flow rate is increased so as to decrease the degree of superheat SH.

Particularly, at the time of cooling, when the adjustment range of the degree of opening is within the opening degree adjustment range (for example, 500 pulses) of the first motor-actuated expansion valve 10, the degree of opening of the first motor-actuated expansion valve 10 is adjusted in a state where the second motor-actuated expansion valve 11 is set at the predetermined minimum degree of opening (for example, 50 pulses). When the adjustment range of the degree of opening exceeds the opening degree adjustment range of the first motor-actuated expansion valve 10, the degree of opening of the second motor-actuated expansion valve 11 is adjusted in a state where the first motor-actuated expansion valve 10 is set the maximum degree of opening (500 pulses).

At the time of heating, when the adjustment range of the degree of opening is within the opening degree adjustment range (for example, 500 pulses) of the second motor-actuated expansion valve 11, the degree of opening of the second motor-actuated expansion valve 11 is adjusted in a state where the first motor-actuated expansion valve 10 is set at the predetermined minimum degree of opening (for example, 50 pulses). When the adjustment range of the degree of opening exceeds the opening degree adjustment range of the second motor-actuated expansion valve 11, the degree of opening of the first motor-actuated expansion valve 10 is adjusted in a state where the second motor-actuated expansion valve 11 is set the maximum degree of opening (500 pulses).

When the compressor 4 is stopped (NO in step 101), the operation of each of the motor-actuated expansion valves 10 and 11 is stopped, and both the motor-actuated expansion valves 10 and 11 are fully closed (0 pulses).

Figure 5:
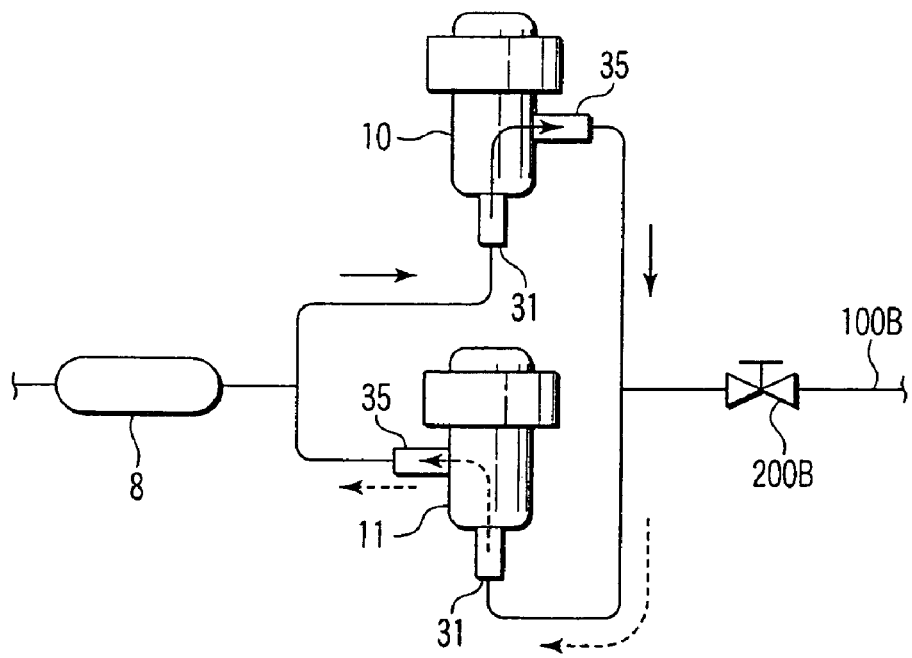
FIG. 5 is a view showing the flow of the refrigerant in a liquid-sealed state of the embodiment.

At the time of cooling, when the compressor 4 is stopped and the motor-actuated expansion valves 10 and 11 are fully closed, a liquid-sealed state where the refrigerant flow path from the backflow check valve 15 to the motor-actuated expansion valves 10 and 11 through the outdoor heat exchanger 6 is filled with liquid refrigerant is liable to occur. When this liquid-sealed state occurs, and the pressure of the refrigerant collected there becomes high, the first motor-actuated expansion valve 10 is opened by the refrigerant pressure, and a flow of the refrigerant flowing from the first connection pipe 31 (on the outdoor heat exchanger 6 side) to the second connection pipe 35 (on the indoor heat exchanger side) is produced as shown in FIG. 5 by solid line arrows. By virtue of this flow of the refrigerant, an abnormal rise in the refrigerant pressure is avoided. As a result of this, it is possible to prevent the outdoor heat exchanger 6 and the receiver tank 8, and the like from being damaged, and the reliability is improved.

Incidentally, after the compressor 4 is stopped, both the motor-actuated expansion valves 10 and 11 may be set at the minimum degree of opening (50 pulses) until a predetermined period of time elapses, and the motor-actuated expansion valves 10 and 11 may be fully closed after the refrigerant has flowed to the indoor heat exchanger 12 side. This makes the liquid-sealed state hardly occur, and improves the reliability further.

At the time of heating, when the compressor 4 is stopped, and the motor-actuated expansion valves 10 and 11 are fully closed, the liquid-sealed state where the refrigerant flow path on the outdoor heat exchanger 6 side is filled with the liquid refrigerant is liable to occur after the flow paths of the four-way valve 5 are returned to the normal state (the state at the time of cooling), as at the time of cooling. In this case too, the first motor-actuated expansion valve 10 is opened as described above, and a flow of the refrigerant flowing from the first connection pipe 31 (on the outdoor heat exchanger 6 side) of the first motor-actuated expansion valve 10 to the second connection pipe 35 (on the indoor heat exchanger 12 side) is produced. By virtue of this flow of the refrigerant, an abnormal rise in the refrigerant pressure is avoided. As a result of this, it is possible to prevent the outdoor heat exchanger 6 and the receiver tank 8, and the like from being damaged, and the reliability is improved.

Further, at the time of product shipment of the apparatus, the motor-actuated expansion valves 10 and 11 are fully closed, and moreover the service valves 200A and 200B are closed, and hence a liquid-sealed state where the piping between the motor-actuated expansion valves 10 and 11 and the liquid pipe service valve 200B is filled with the liquid refrigerant is liable to occur. If this liquid-sealed state occurs, and the pressure of the collected refrigerant becomes high, the second motor-actuated expansion valve 11 is opened by the refrigerant pressure, and a flow of the refrigerant flowing from the first connection pipe 31 (on the liquid pipe service valve 200B side) of the second motor-actuated expansion valve 11 to the second connection pipe 35 (on the outdoor heat exchanger 6 side) is produced. By virtue of this flow of the refrigerant, an abnormal rise in the refrigerant pressure is avoided. As a result of this, it is possible to prevent the outdoor heat exchanger 6 and the receiver tank 8, and the like from being damaged, and the reliability is improved.

Incidentally, the present invention is not limited to the embodiment described above, and can be variously modified to be implemented within a scope not deviating from the gist of the invention. For example, the number of motor-actuated expansion valves is not limited to the two motor-actuated expansion valves 10 and 11, and three or more motor-actuated expansion valves may be used.

The air conditioning apparatus of the present invention can be utilized for a refrigerating apparatus in which a refrigerating cycle is provided with a plurality of motor-actuated expansion valves.

What is claimed is:

1. An air conditioning apparatus comprising:
   a refrigerating cycle which includes at least a compressor for sucking a refrigerant, compressing the sucked refrigerant, and discharging the compressed refrigerant, and in which the refrigerant discharged from the compressor is returned to the compressor through an outdoor heat exchanger, and an indoor heat exchanger;
   at least a first motor-actuated expansion valve which is provided between the outdoor heat exchanger and the indoor heat exchanger, and in which at the time of non-operation and full closure, when the refrigerant pressure on the indoor heat exchanger side is higher than the refrigerant pressure on the outdoor heat exchanger side by a predetermined value or more, the full closure is released by receiving the refrigerant pressure on the indoor heat exchanger side; and at least a second motor-actuated expansion valve which is connected in parallel with the first motor-actuated expansion valve, and in which at the time of non-operation and full closure, when the refrigerant pressure on the outdoor heat exchanger side is higher than the refrigerant pressure on the indoor heat exchanger side by a predetermined value or more, the full closure is released by receiving the refrigerant pressure on the outdoor heat exchanger side.

2. The air conditioning apparatus according to claim 1, wherein the refrigerant is the R410 refrigerant with high pressure.

3. The air conditioning apparatus according to claim 1, further comprising:

an inverter for outputting drive power to the compressor;

an indoor temperature sensor for sensing an indoor temperature;

a first detection section for detecting a difference between a sensed temperature of the indoor temperature sensor and a predetermined set temperature as an air-conditioning load;

a second control section for controlling an output frequency of the inverter in accordance with the air-conditioning load detected by the first detection section;

a second detection section for detecting a degree of superheat of the refrigerant in the indoor heat exchanger;

a control section for controlling a degree of opening of each of the motor-actuated expansion valves in such a manner that the degree of superheat detected by the second detection section becomes a predetermined target degree of superheat.

4. The air conditioning apparatus according to claim 3, further comprising a control section for stopping the operation of each of the motor-actuated expansion valves to thereby fully close each of the expansion valves when the compressor is stopped.

5. An air conditioning apparatus comprising:

a heat-pump-type refrigerating cycle which includes at least a compressor for sucking a refrigerant, compressing the sucked refrigerant, and discharging the compressed refrigerant, and in which the refrigerant discharged from the compressor is returned to the compressor through a four-way valve, an outdoor heat exchanger, and an indoor heat exchanger;

at least a first motor-actuated expansion valve which is provided between the outdoor heat exchanger and the indoor heat exchanger, and in which at the time of non-operation and full closure, when the refrigerant pressure on the indoor heat exchanger side is higher than the refrigerant pressure on the outdoor heat exchanger side by a predetermined value or more, the full closure is released by receiving the refrigerant pressure on the indoor heat exchanger side; and at least a second motor-actuated expansion valve which is connected in parallel with the first motor-actuated expansion valve, and in which at the time of non-operation and full closure, when the refrigerant pressure on the outdoor heat exchanger side is higher than the refrigerant pressure on the indoor heat exchanger side by a predetermined value or more, the full closure is released by receiving the refrigerant pressure on the outdoor heat exchanger side.

6. The air conditioning apparatus according to claim 5, wherein the refrigerant is the R410 refrigerant with high pressure.

7. The air conditioning apparatus according to claim 5, further comprising a first control section for forming, at the time of cooling, a cooling cycle in which the refrigerant discharged from the compressor is returned to the compressor through the four-way valve, the outdoor heat exchanger, at least one of the motor-actuated expansion valves, and the indoor heat exchanger, and forming, at the time of heating, a heating cycle in which the refrigerant discharged from the compressor is returned to the compressor through the four-way valve, the indoor heat exchanger, at least one of the motor-actuated expansion valves, and the outdoor heat exchanger.

8. The air conditioning apparatus according to claim 7, further comprising:

an inverter for outputting drive power to the compressor;

an indoor temperature sensor for sensing an indoor temperature;

a first detection section for detecting a difference between a sensed temperature of the indoor temperature sensor and a predetermined set temperature as an air-conditioning load;

a second control section for controlling an output frequency of the inverter in accordance with the air-conditioning load detected by the first detection section;

a second detection section for detecting a degree of superheat of the refrigerant in the indoor heat exchanger at the time of cooling;

a third detection section for detecting a degree of superheat of the refrigerant in the outdoor heat exchanger at the time of heating; and a third control section for controlling a degree of opening of each of the motor-actuated expansion valves in such a manner that the degree of superheat detected by the second detection section or the third detection section becomes a predetermined target degree of superheat.

9. The air conditioning apparatus according to claim 8, further comprising a fourth control section for stopping the operation of each of the motor-actuated expansion valves to thereby fully close each of the expansion valves when the compressor is stopped.

* * * * *